United States Patent
Pastrana

(10) Patent No.: US 11,238,149 B2
(45) Date of Patent: Feb. 1, 2022

(54) COMPUTERIZED USER AUTHENTICATION METHOD THAT UTILIZES THE CARTESIAN COORDINATE SYSTEM TO VERIFY A USER'S IDENTITY

(71) Applicant: Joseph Carlo Pastrana, Hampton, VA (US)

(72) Inventor: Joseph Carlo Pastrana, Hampton, VA (US)

( * ) Notice: Subject to any disclaimer, the term of this patent is extended or adjusted under 35 U.S.C. 154(b) by 575 days.

(21) Appl. No.: 16/276,585

(22) Filed: Feb. 14, 2019

(65) Prior Publication Data

US 2019/0180020 A1    Jun. 13, 2019

Related U.S. Application Data

(60) Provisional application No. 62/797,711, filed on Jan. 28, 2019.

(51) Int. Cl.
| | |
|---|---|
| *G06F 21/36* | (2013.01) |
| *G06F 21/31* | (2013.01) |
| *G06F 21/32* | (2013.01) |
| *G06F 21/45* | (2013.01) |
| *G06T 11/20* | (2006.01) |
| *G06F 3/0488* | (2013.01) |

(52) U.S. Cl.
CPC ............ *G06F 21/36* (2013.01); *G06F 21/316* (2013.01); *G06F 21/32* (2013.01); *G06F 21/45* (2013.01); *G06T 11/203* (2013.01); *G06F 3/04883* (2013.01); *G06F 2221/2103* (2013.01)

(58) Field of Classification Search
CPC ........ G06F 21/36; G06F 21/316; G06F 21/32; G06F 21/45; G06F 3/04883; G06F 2221/2103; G06T 11/203
See application file for complete search history.

(56) References Cited

U.S. PATENT DOCUMENTS

| | | | | |
|---|---|---|---|---|
| 2003/0131094 A1* | 7/2003 | Awada | ..................... | G06F 9/468 709/224 |
| 2006/0095794 A1* | 5/2006 | Nunnelley | .............. | G06F 21/36 713/193 |
| 2008/0098464 A1* | 4/2008 | Mizrah | .................... | G06F 21/36 726/5 |
| 2013/0014248 A1* | 1/2013 | McLaughlin | ....... | G06F 3/04883 726/17 |
| 2014/0289843 A1* | 9/2014 | Chiang | ............... | G06F 3/04842 726/19 |

(Continued)

*Primary Examiner* — Darren B Schwartz

(57) ABSTRACT

A computerized user authentication method that utilizes a digital drawing created by a user and the Cartesian Coordinate System to verify the user's identity. The method utilizes a software-driven stopwatch integrated into a computing device to measure time, establish a time baseline, and control the scanning expanse of a digital drawing. To verify the identity of the user, the acquired X Axis and Y Axis values that represent the scanned segment of the digital drawing, which were previously correlated to the user, are used as part of his/her authentication credentials to obtain access to computer information systems and portable computing devices. Since the authentication process requires the user to stop the stopwatch within the user-assigned time range, the clocked time value is also used to identify the user. Admissible time and axis values are stored in a database for comparison during the user authentication process.

2 Claims, 4 Drawing Sheets

(56) References Cited

U.S. PATENT DOCUMENTS

| | | | |
|---|---|---|---|
| 2014/0333524 A1* | 11/2014 | Liu | H04L 63/08 |
| | | | 345/156 |
| 2016/0055329 A1* | 2/2016 | Akula | H04L 63/083 |
| | | | 726/7 |
| 2016/0253490 A1* | 9/2016 | Hong | G06F 21/36 |
| | | | 726/7 |
| 2018/0373861 A1* | 12/2018 | Pastrana | G06F 21/40 |

* cited by examiner

Fig. 4

| Time Range: 3.00 to 4.00 Seconds | Time in Seconds | X Axis Values | Y Axis Values | |
|---|---|---|---|---|
| | 0.01 | 0.002 | 5.267 | |
| | 0.20 | 2.684 | 5.154 | |
| | 0.40 | 2.049 | 5.078 | |
| | 0.60 | 3.745 | 4.674 | |
| | 0.80 | 4.846 | 4.257 | |
| | 1.00 | 5.271 | 3.954 | |
| | 1.20 | 6.846 | 3.872 | |
| | 1.40 | 7.055 | 3.671 | |
| | 1.60 | 8.258 | 3.305 | |
| | 1.80 | 10.075 | 3.007 | |
| | 2.00 | 11.078 | 3.222 | Digital Drawing Segment - X Axis and Y Axis values to be used to identify the user (User ID Credential). Segment = 2.00 seconds prior to the Clocked Time. |
| | 2.20 | 12.284 | 3.418 | |
| | 2.40 | 13.871 | 3.334 | |
| | 2.60 | 14.641 | 3.212 | |
| | 2.80 | 15.978 | 3.188 | |
| | 3.00 | 16.661 | 3.118 | |
| Clocked Time = 3.214 seconds → | 3.214 | 18.001 | 3.107 | |
| X Axis = 18.001, Y Axis = 3.107 | 3.40 | 19.245 | 2.991 | |
| (At the time the Stopwatch | 3.60 | 20.888 | 2.964 | |
| was Stopped by the User) | 3.80 | 21.441 | 2.922 | |
| | 4.00 | 22.441 | 2.876 | |
| | 4.20 | 23.229 | 2.809 | |
| | 4.40 | 24.177 | 2.701 | |
| | 4.60 | 25.207 | 2.664 | |
| | 4.80 | 26.222 | 2.572 | |
| | 5.00 | 27.487 | 2.489 | |

Fig. 5

Steps to Utilize the Method after the Invention is Implemented:

1) User Registration - The User enters his/her PII (Password, User ID, Time Range Values)

2) User creates and stores a Digital Drawing on his/her computing device and in the web server's database as part of his/her registration process 3) Web server generates and stores the X Axis and Y Axis values representing the digital drawing correlated to the user as part of the user's Personal Identifiable Information (PII)

4) After the above steps are completed, the user is ready to go through the authentication process and able to access the information system utilizing his/her stored digital drawing 5) User starts the login/authentication process by entering his/her User ID and Password, then;

6) The user's computing device communicates to the web server that he/she is attempting to access through his/her computing device, then;

7) After the web server accepts the user's Password and User ID, the server instructs the user's computing device to commence the scanning of the digital drawing stored in the user's device memory, then;

8) The user's device initiates the functioning of the Software-Driven Digital Stopwatch and the scanning process of the digital drawing (the Stopwatch is now measuring time), then;

9) The user stops the stopwatch when it reached a time value within the user's assigned time range while simultaneously, the user computing device stops the scanning of the digital drawing stored in the user computing device's memory, then;

10) The user's computing device transmits to the web server the clocked time value and the X Axis and Y Axis values obtained from the scanning of the digital drawing, if all numerical values are matching the stored values located in the web server's database, the user is authenticated and gain access to the information system. Before logging out, the user creates and stores a new digital drawing to replace the current digital drawing (the new drawing is stored in the user's computing device and in the server's database).

Fig. 6

Steps to Utilize the Method (Without the Stopwatch Feature/Characteristic) after the Invention is Implemented:

1) A user uploads the method's application (software) from a secured network/website and registers at the secured network/website; thus, the User enters his/her PII (Password and User ID).

2) The user creates and stores a Password, a User ID, and a Digital Drawing on his/her computing device and in the network/website server's database as part of his/her registration process.

3) The network/website server generates and stores the X Axis and Y Axis numerical values representing the digital drawing created by the user as part of the user's PII.

4) After the above steps are completed, the user is ready to perform the authentication process and able to access the secure network/website utilizing the digital drawing stored in his/her computer device.

5) The user, through his/her computer device, communicates with the network/website server and starts the login/authentication process by entering his/her User ID and Password, then;

6) After the network/website server accepts the user's Password and User ID, the user instructs his/her computing device to commence the scanning of the digital drawing stored in the device's memory to generate the X Axis and Y Axis values, then;

7) The computing device completes the scanning of the digital drawing stored in the user computing device's memory, then;

8) The user's computing device transmits to the web server the X Axis and Y Axis values obtained from the scanning of the digital drawing, if all numerical values match the stored values located in the web server's database, the user is authenticated and gains access to the secured network/website. Before logging out, the user creates and stores a new digital drawing to replace the current digital drawing. The newly user-created drawing is stored in the user's computing device while the drawing and/or the drawing's X Axis and Y Axis values are stored in the network/website server's database to authenticate the user during the next login process.

COMPUTERIZED USER AUTHENTICATION METHOD THAT UTILIZES THE CARTESIAN COORDINATE SYSTEM TO VERIFY A USER'S IDENTITY

CROSS-REFERENCE TO RELATED APPLICATIONS

Not applicable to this application

FEDERALLY SPONSORED RESEARCH OR DEVELOPMENT

Not applicable to this application

SEQUENCE LISTING, A TABLE, OR A COMPUTER PROGRAM LISTING

Not applicable to this application

COMPACT DISC APPENDIX

Not applicable to this application

STATEMENT REGARDING PRIOR DISCLOSURES BY THE INVENTOR

Not applicable to this application

BACKGROUND OF THE INVENTION

The technical field of the invention relates to the security of data residing on computer information systems and portable computing devices, such as a laptop, tablet, iPad, cellular telephone, networks, or the like. More particularly, the present invention relates to the field of user authentication to secure the integrity of the data being created, stored and managed by the abovementioned devices. For example, when a user is initiating an interface with a computerized information system, entering identification information, or some form of login data, an authentication of the login data is almost always required to create, manage and secure electronic documents. Login methods, such as the method of a user at the client console simply entering a username and password, which is verified by the server, or methods of login involving one-time password keys, where a password works only once, are used for user authentication.

These and other methods still unable to avoid security problems, especially when an unauthorized person fraudulently obtains access into a secured computer system and he/she illicitly alters the data stored in a database. Accordingly, improving systems and methods for user login authentication, data security, and data integrity remain highly desirable.

DESCRIPTION OF PRIOR ART

Not applicable to this application

BRIEF SUMMARY OF THE INVENTION

The invention consists of a computerized user authentication method comprising of a computing device (e.g. smartphone) scanning a user-created digital drawing to generate the X Axis values and Y Axis values that represents the scanned segment of a digital drawing according to the principles of the Cartesian Coordinate System, wherein the said X Axis and Y Axis values are digitally correlated to the user's Personal Identifiable Information (PII) and functioning as a user identification factor to verify the user's identity when the said user is attempting to access through his/her computing device a web server, application server, database server or a network server.

The invention utilizes the principles of the Cartesian Coordinate System to verify the identity of a user by assigning the unique X Axis values and Y Axis values that represent the composition of the user-created digital drawing to the user. As a result, the X Axis and Y Axis values become an additional personal identifiable information factor correlated to the user. To create the digital drawing, the user utilizes his/her computing device's electronic input device (e.g. computing device's touch screen, light pen) to scribble a digital drawing.

The invention utilizes a computer software specifically developed for the control, operation, and functioning of this method in the user's computing device as well as the web servers, application servers, database servers and network servers and wherein the said computer software enables the user and the user's computing device to create and store digital drawings and enables the operation of a digital stopwatch functioning in the user's computing device. Hence, the said computer software is installed into the web servers, application servers, database servers and network servers being accessed by the user's computing device to make possible the authentication of the user.

As part of the authentication method, a software-driven digital stopwatch, which is electronically integrated into the user's computing device, is used to start the scanning process of the digital drawing. Once started, the scanning process acquires the X Axis and Y Axis values of the digital drawing until the time the stopwatch is stopped by the user. The scanning of the digital drawing begins on one end of the digital drawing and will continue for a programmed length of time until the entire drawing is scanned (e.g. scan time=10 seconds, see FIG. 1). The user stops the stopwatch within a specific time range that was previously assigned to him/her. As soon as the stopwatch is stopped, the computing device stops the scanning of the digital drawing, ending the acquisition of the X Axis and Y Axis values that embodies the scanned segment of the digital drawing. The resulting X Axis and Y Axis values are then compared against the X Axis and Y Axis values stored in the server's database for user authentication. The X Axis and Y Axis values stored in the said database were previously generated when the user created a disparate digital drawing as part of his Personal Identifiable Information (e.g. user id, password, time range allowable values).

The invention provides flexibility and advantages consisting of:

a) Several set-ups to acquire X Axis and Y Axis Values are possible. The entire array of X Axis and Y Axis values scanned until the software-driven digital stopwatch is stopped could be used and compared to the totality of X Axis and Y Axis values that embodies the scanned segment of the digital drawing stored in the database. As an option to the utilization of the entire array of X Axis and Y Axis values representing the scanned segment of the digital drawing, only the last scanned X Axis value and Y Axis value at the time the stopwatch is stopped is compared to the X Axis value and Y Axis value stored in the database to authenticate the user. Furthermore, more than one segment of the digital drawing could be scanned and utilized to authenticate the user.

b) Digital drawings updates. The disparate scribble that forms the digital drawing created by the user can be replaced with a new user-created digital drawing every time the user is logging out and wherein the new digital drawing is stored in the server's database for the next authentication of the user. As a result, the X Axis and Y Axis numerical values are constantly changing and becoming in effect a One-Time Password verification system. Likewise, the digital drawing created by the user can be periodically replaced with a new digital drawing by the user (e.g. every week or every month). Another benefit of this method is that the user doesn't have to memorize a new and lengthy identification construct (e.g. password) since the user is only creating and storing a digital drawing in his/her computing device every time he/she changes the said digital drawing. Consequently, the user doesn't have to memorize new added identification data or new answers to additional secret questions to identify himself/herself as the computing device scans every newly created digital drawing and provides new digital drawing's X Axis and Y Axis values to the web server to be stored and used as the new identification data to identify the user.

c) The time values representing the Time Range are changeable. The user can periodically (e.g. every week) update the specific moment the time range starts. For example, the user can change a time range that currently starts at 3 seconds and ends at 4 seconds to a time range that starts at 7 seconds and ends at 8 seconds.

d) The Duration of the Time Range can be adjustable. The time duration of the time range is alterable (e.g. from a 1 second duration to 3 seconds duration).

e) Several time ranges can be combined to authenticate the user. The software-driven digital stopwatch can be programmed to be stopped more than one time. The said stopwatch can be programmed to re-start automatically after the user stops it successfully the first time and be stopped a second time in a different time range. For example, the user can be required to stop the stopwatch for the first time between 7 and 8 seconds (first time range) and to be stopped a second time between 5 and 6 seconds (in the second time range, see FIG. 3 for a graphical representation of the concept).

f) The software-driven digital stopwatch can be encrypted to provide additional security and to verify the identity of the user. For example, through a mathematical process wherein the historical clocked time values are stored in the user's computing device and compared against the values stored in the database of the web server (host's computer) for added user verification.

BRIEF DESCRIPTION OF THE SEVERAL VIEWS OF THE DRAWINGS

The drawings are illustrated as examples of probable digital drawings created by a user and are not to limit the different shapes which can be created by the user, as such:

FIG. 3 is depicting how two sets of X Axis and Y Axis values with two clocked times can be achieved utilizing a single digital drawing.

FIG. 4 depicts the X Axis and Y Axis values that embodies the totality of the digital drawing (see FIG. 1) as well as X Axis and Y Axis values that embodies the scanned segment of the digital drawing. Furthermore, FIG. 4 also provides the correlation between Time values and the X and Y axis values. The X Axis and Y Axis values representing the scanned segment of the digital drawing are utilized to authenticate the user (X and Y Axis values scanned between 1.200 seconds and 3.214 seconds, or as the 2 seconds prior to the clocked time).

FIG. 5 depicts a summary of the user's login procedure when the authentication method is utilized (the entering of the User's Password, User ID, the Clocked Time Value, and the X Axis and Y Axis values representing the user created digital drawing).

FIG. 6 depicts a summary of the user's login procedure, without using the Stopwatch, when the authentication method is utilized (the entering of the User's Password, User ID, and the X Axis and Y Axis values representing the user created digital drawing).

DETAILED DESCRIPTION OF THE INVENTION

Figure 1:
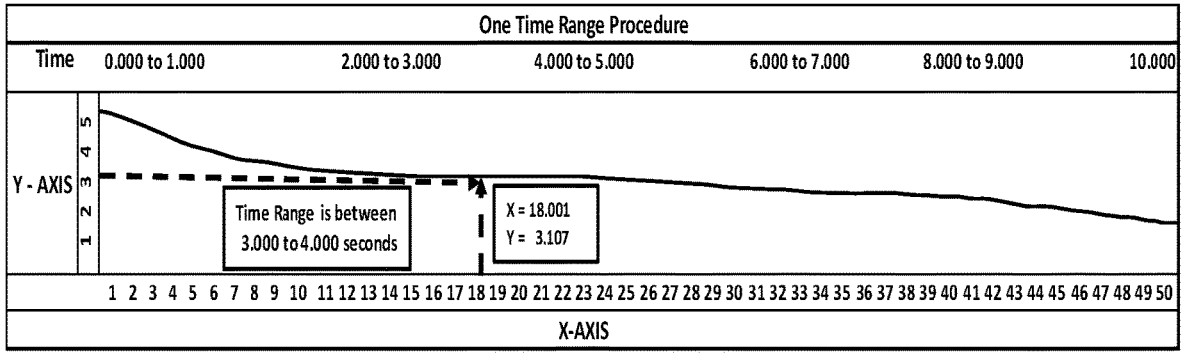
FIG. 1 depicts a scribbled digital drawing in the shape of a linear silhouette to generate X Axis and Y Axis. In this depiction, the Clocked Time is 3.214 seconds, X Axis value is 18.001 and Y Axis value is 3.107.
Figure 2:
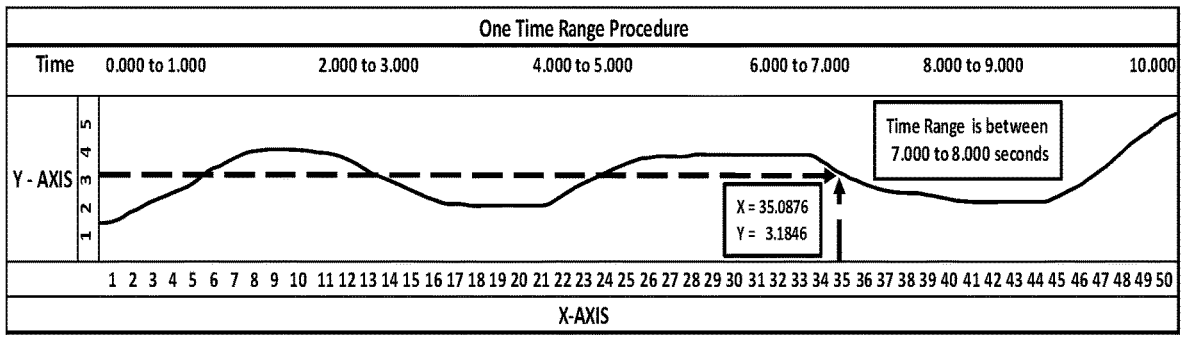
FIG. 2 depicts another scribbled digital drawing in the shape of an undulating silhouette to generate X Axis and Y Axis values. This example is provided to demonstrate the different silhouettes a user can create.
Figure 3:
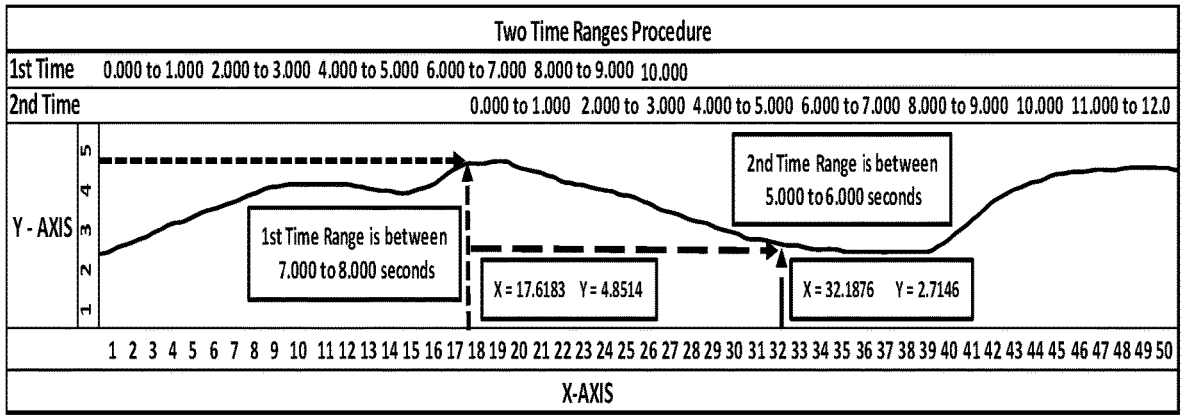
FIG. 3 depicts one scribbled digital drawing wherein the undulating silhouette is used to generate two different sets of X Axis and Y Axis values and in which the ending time corresponding to the first clocked time is utilized as the starting time of the second set of X Axis and Y Axis values, thus.

The following description of the embodiments of the invention is not intended to limit the invention to these mentioned embodiments, but rather to enable any person skilled in the art to make and use this invention. The invention is a computerized user authentication method that utilizes the Cartesian Coordinate System and a software-driven digital stopwatch electronically integrated into a computing device to verify a user's identity. The subject matter disclosed is capable of considerable modification, alteration, and equivalents in form and function, as will occur to one having ordinary skill in the art and the benefit of this disclosure and it is to be accorded the widest scope consistent with the principles and features disclosed herein. The term "Computing Device" is used in this patent application to refer to portable computing devices and computer information systems and to be an equivalent to the term "Software-Driven Device".

The invention consists of a computerized user authentication method which utilizes the principles of the Cartesian Coordinate System and a software-driven digital stopwatch electronically integrated and operated by a computing device (e.g. Smartphone) to acquire a time value within a time range previously assigned to the user and to acquire an array of X Axis and Y Axis values representing at least a segment of a digital drawing previously created and stored by the user in his/her computing device and wherein the X Axis and Y Axis values representing the totality of the digital drawing are also stored in the web servers that the user will attempt to access. The said totality of X Axis and Y Axis values, as well as a set of time values representing a time range, are correlated to the user and are components of his/her Personal Identifiable Information (PII). Accordingly, when in an attempt to obtain access to a secure website, the user initiates the functioning of the said software-driven digital stopwatch to measure time, which also initiates simultaneously the scanning of the digital drawing until the user stops the said stopwatch and hence the scanning process. As a result of having stopped the stopwatch and having completed the scanning of a segment of the digital drawing, the computing device proceeds to transmit the X Axis and Y Axis values representing the scanned segment of the digital drawing and the clocked time value to the web server as part of the user authentication process. If the clocked time value and the X Axis and Y Axis values transmitted match the values stored in the web server's database, the user obtains access to the secure website (e.g. the user's smartphone transmits to a bank's secured website the user's PII, including the time and X Axis and Y Axis values, to obtain access to his/her bank account information).

To acquire a time value (clocked time) within the time range assigned to the user, the user stops the stopwatch through the input of any key (e.g. clicking on the "Enter" key located on the keyboard). The Stopwatch is initiated by the user when the authentication process requires the user to start the stopwatch and the user stops the stopwatch when he/she is within his/her assigned time range. The X Axis and Y Axis values representing the entire digital drawing as well as the time values associated with the time range are all correlated to the user as a PII factors and stored in a server for the purpose of identifying the user when the user is attempting to obtain access to said server.

The user's computing device utilizes the user's clocked time as the baseline time to help define the segment of the digital drawing to be scanned and as a result, the X Axis and Y Axis values that will represent the scanned segment of the digital drawing to be used to authenticate user during the authentication process. For example, in FIG. 4, the X Axis and Y Axis values acquired during the last 2 seconds of the scanning process prior to the clocked time (and including the clocked time) are utilized to authenticate the user. In FIG. 4, the time value at the moment the stopwatch was stopped by the user was 3.214 seconds and the X Axis value was 18.001 and Y Axis value was 3.107. The 18.001 X Axis value and the 3.107 Y Axis value and the X Axis and Y Axis values obtained during the last 2 seconds of the scanning process represent the segment of the digital drawing that will be utilized to authenticate the user, see FIG. 4 for a graphical representation of the concept. The scanning of the digital drawing begins on one end of the digital drawing and will continue for a programmed length of time until the entire drawing is scanned (e.g. scan time=10 seconds, see FIG. 1).

For a proper operation and functioning this authentication method, a computer software must be developed and installed into the user's computing device as well as the web servers, application servers, database servers and network servers to be accessed by the user's computing device. Furthermore, the proposed digital scanning capability required to be functioning in the user's computing device is available and currently being used in computer systems utilizing computer programs such as AutoCAD. Once the software created to support the invention's methodology is installed into the servers and the user's computing device, and becomes operational, the user can utilize the invention to identify himself/herself during an authentication process that employs this invention's methodology.

To illustrate the functioning of the invention, the method comprises the steps of:

a) A user initiating the verification process and proceeds to enter his/her user identification and password through his/her computing device, then;

b) the user, through the computing device, initiates the functioning of the software-driven digital stopwatch to measure time and to simultaneously initiate the scanning of the digital drawing (the digital drawing was previously stored in his/her computing device's electronic memory (RAM)), then;

c) the computing device displays the digital drawing created by the user and as time continues course, the computing device is continuously scanning the digital drawing and acquiring the X Axis and the Y Axis array of values that represents the area of the digital drawing being scanned, then;

d) the user stops the software-driven digital stopwatch when it is within his/her assigned time range, which in turn, also stops the scanning process of the digital drawing, then;

e) the user's computing device utilizes the user's clocked time as the Baseline Time to define the segment of the digital drawing and the X Axis and Y Axis values that embodies the scanned segment of the digital drawing, then;

f) the resulting X Axis and Y Axis values are compared against the X Axis and Y Axis values stored in the web server's database (e.g. host's computer system) for user authentication, then;

g) after the X Axis and Y Axis values are compared against the values stored in the server's database, the computing device's display provides a message to the user that the authentication process was successful or that the user authentication process was not successful.

For the method to function as designed and intended, a digital correlation between the X Axis and Y Axis values representing the entire digital drawing and the user is created to identify the user during an authentication process (e.g. during the scanning of the user-created digital drawing to acquire the X Axis and Y Axis values). Also, a digital correlation between the Time Range values and the user is likewise created to identify user during the said authentication process. Accordingly, the Time Range values as well as the plurality of the said X Axis and Y Axis values become part of the User's PII (Personal Identifiable Information) and wherein the said digitally created correlations are stored in the web servers, application servers, database servers and network servers being accessed by the user's computing device for the authentication of the user.

The invention is designed to operate in web servers and network systems where the user is required to verify his/her identity and where he/she is accessing these information systems through his/her computing device. Login methods, such as the method of a user at the client console simply inputting a username and password, which is verified by the server, or methods of login involving one-time password keys, where a password works only once, can be strengthened by the present invention. Likewise, the invention is also designed to operate as a stand-alone system in personal computing devices such as a personal computer, user ID/Password controlled electronic apparatuses, and portable computing devices, such as laptops, tablets, iPads, or cellular telephones.

The invention requires the user's computing device to have a software-driven input device (e.g. touch screen, a "mouse" or electronic pen) capable of assisting the user to create a distinct digital drawing when he/she is required to provide it as part of his/her PII data. To create the digital drawing, the user utilizes his/her computing device's electronic input device to scribble the said digital drawing.

Digital drawings updates. The disparate scribble that forms the digital drawing created by the user can be replaced with a new user-created digital drawing every time the user is logging out and wherein the new digital drawing is stored in the server's database for the next authentication of the user. As a result, the X Axis and Y Axis numerical values are constantly changing and becoming in effect a One-Time Password verification system.

The abovementioned description of the embodiments of the invention is not intended to limit the invention. The invention is capable of considerable modification, alteration, and equivalents in form and function and can be utilized in numerous computing devices and computer information systems.

I claim:

1. A computerized user authentication method comprising:

entering, by a user of a computing device, a user identification and a password;

responsive to the entering, starting a software-driven digital stopwatch, the software-driven digital stopwatch operating on the computing device;

acquiring, by the computing device, X-Axis values and Y-Axis values of a digital drawing being drawn by the user;

stopping, by the user via an input device of the computing device, the software-driven digital stopwatch within a time range, and ending the acquiring;

responsive to ending the acquiring, authenticating by a server device, the server device storing second X-Axis values, second Y-Axis values and an assigned time range, by performing:

displaying, by the computing device, a message to the user that the authenticating was successful or not successful based on performing:

(i) comparing the acquired X-Axis values and Y-Axis values against the second X-Axis values and the second Y-Axis values, respectively, and (ii) comparing the time range with the assigned time range.

2. A computerized user authentication method comprising:

initiating, by a user of a computing device, a software-driven digital stopwatch, while simultaneously scanning a digital drawing of the user, wherein: the software-driven digital stopwatch operates on the computing device and the digital drawing comprises a last segment after all other segments in the digital drawing;

stopping by the user, via an input device of the computing device, the software-driven digital stopwatch at a time value;

acquiring X-Axis values, Y-Axis values and the time value corresponding to the last segment;

authenticating the user of the computing device, via a server device, based on the X-Axis values, the Y-Axis values and the time value corresponding to only the last segment;

granting access to the server based on the authenticating the user.

* * * * *